W. B. GAGE.
Car-Axle Box.

No. 14,560.

6 Sheets—Sheet 1.

Patented Apr. 1, 1856.

W. B. GAGE.
Car-Axle Box.

No. 14,560.

6 Sheets—Sheet 2.

Patented Apr. 1, 1856.

W. B. GAGE.
Car-Axle Box.

No. 14,560.

6 Sheets—Sheet 3.

Patented Apr. 1, 1856.

W. B. GAGE.
Car-Axle Box.

No. 14,560.

6 Sheets—Sheet 4.

Patented Apr. 1, 1856.

W. B. GAGE.
Car-Axle Box.

No. 14,560.

6 Sheets—Sheet 5.

Patented Apr. 1, 1856.

W. B. GAGE.
Car-Axle Box.

No. 14,560.

6 Sheets—Sheet 6.

Patented Apr. 1, 1856.

UNITED STATES PATENT OFFICE.

WM. B. GAGE, OF LOUISVILLE, KENTUCKY.

JOURNAL-BOX FOR RAILROAD-CAR AXLES.

Specification of Letters Patent No. 14,560, dated April 1, 1856.

*To all whom it may concern:*

Be it known that I, WM. B. GAGE, of Louisville, Kentucky, have invented a new and useful Improvement on Boxes for the Bearings of Shafts or Axles to Steam-Engine Tenders and Cars on Railroads; and I do hereby declare that the following is a full, clear, and exact description of the construction and operation of the same, reference being had to the annexed drawings, making a part of this specification, in which—

Figure 1:
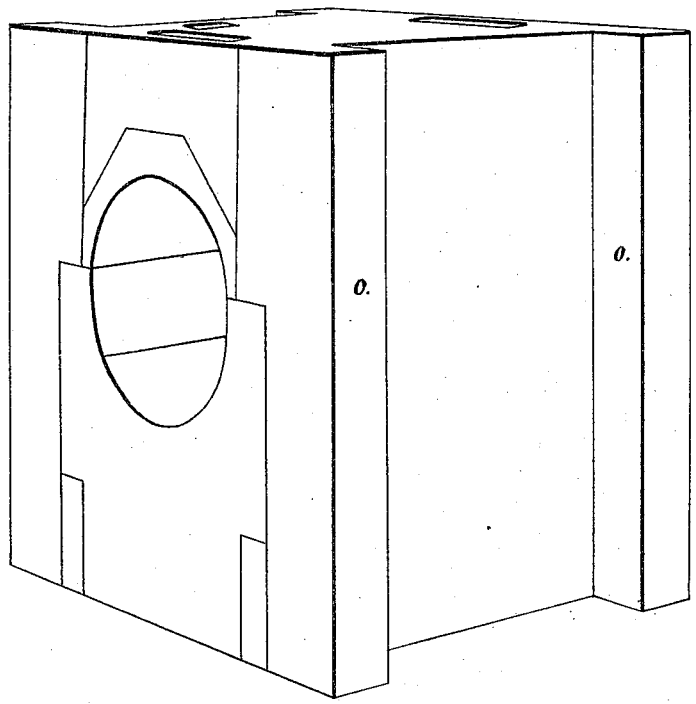
Figure 2:
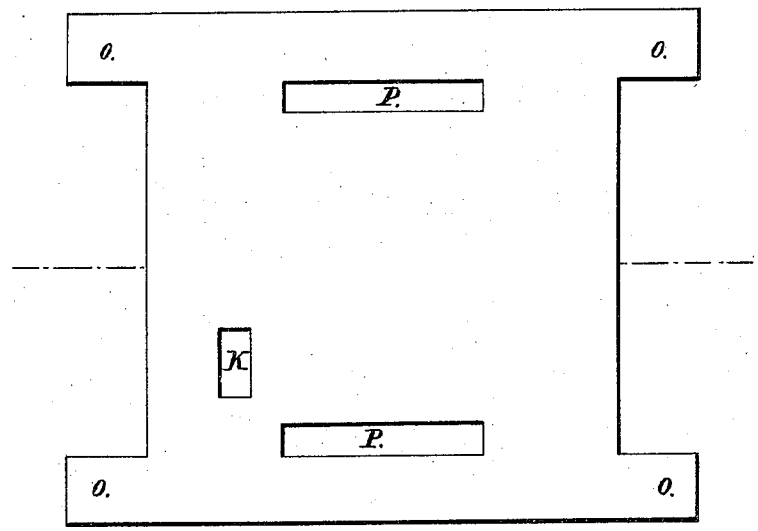
Figure 3:
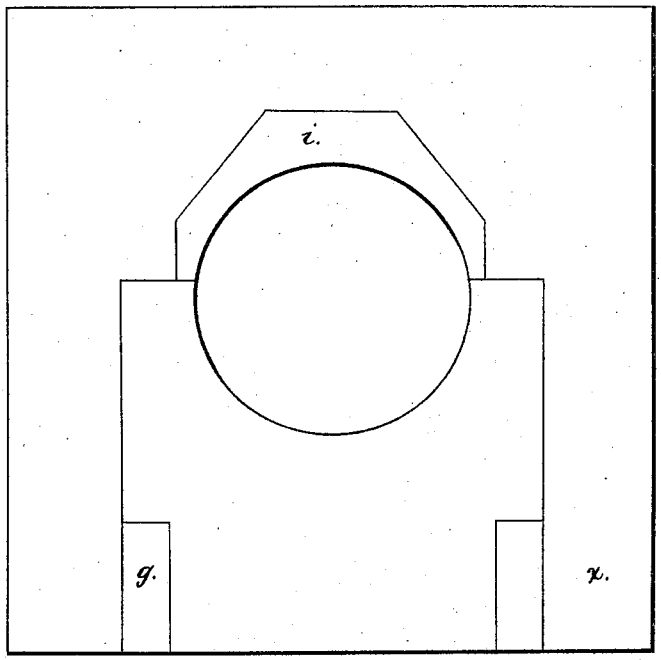
Figure 4:
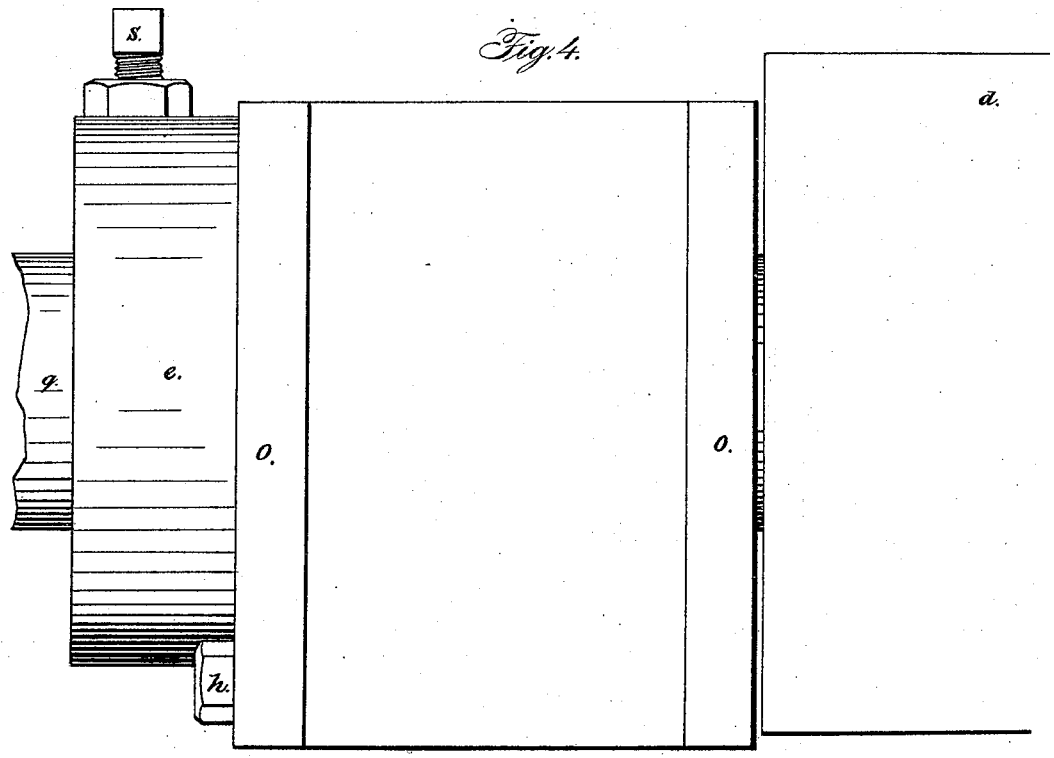
Figure 5:
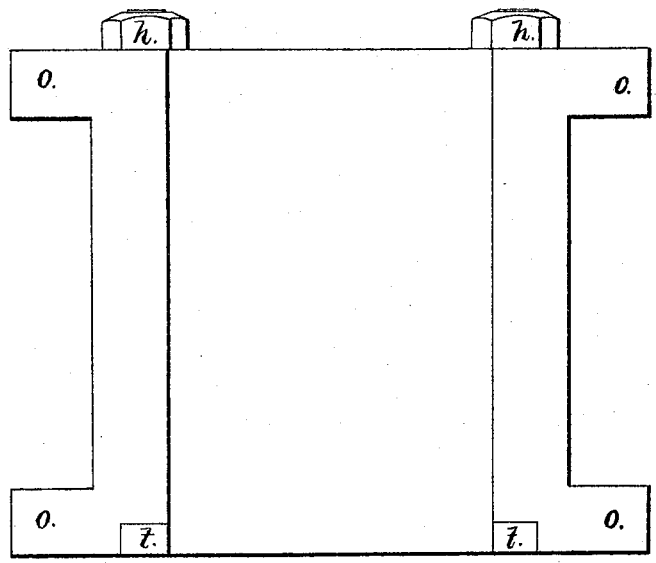
Figure 6:
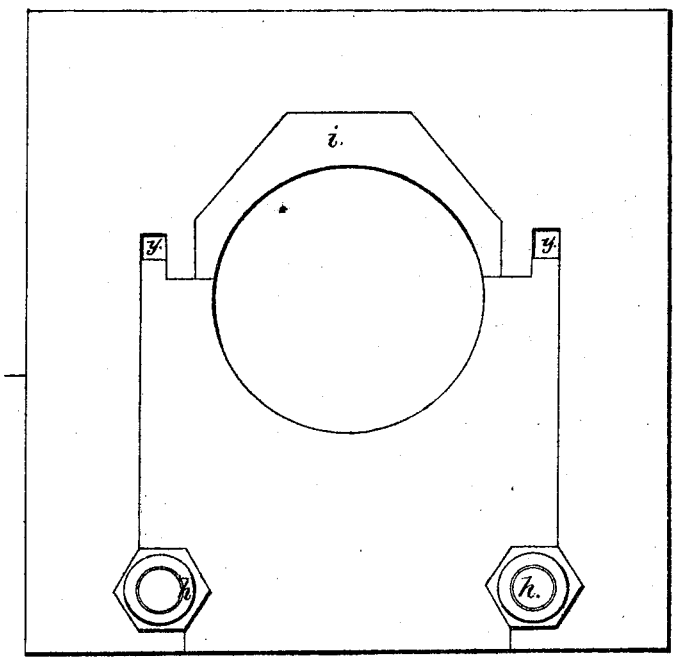
Figure 7:
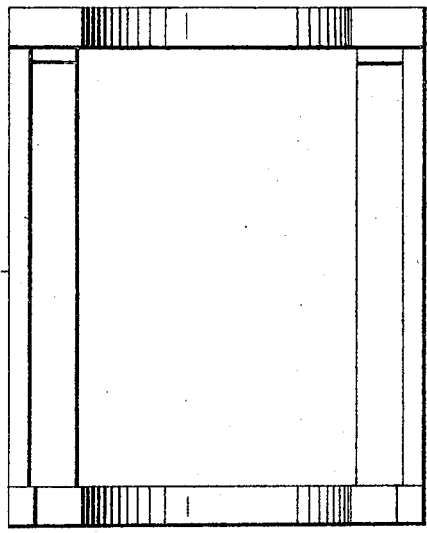
Figure 8:
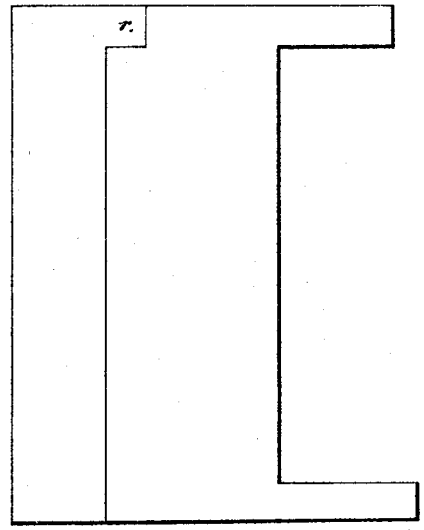
Figure 9:
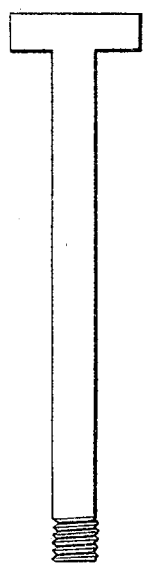
Figure 10:
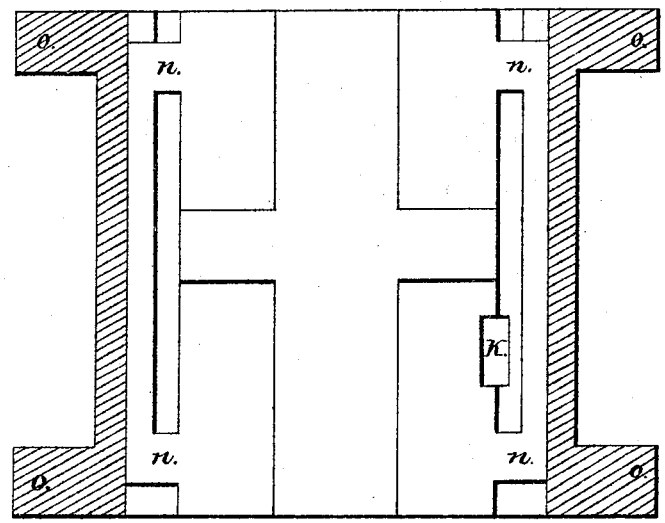
Figure 11:
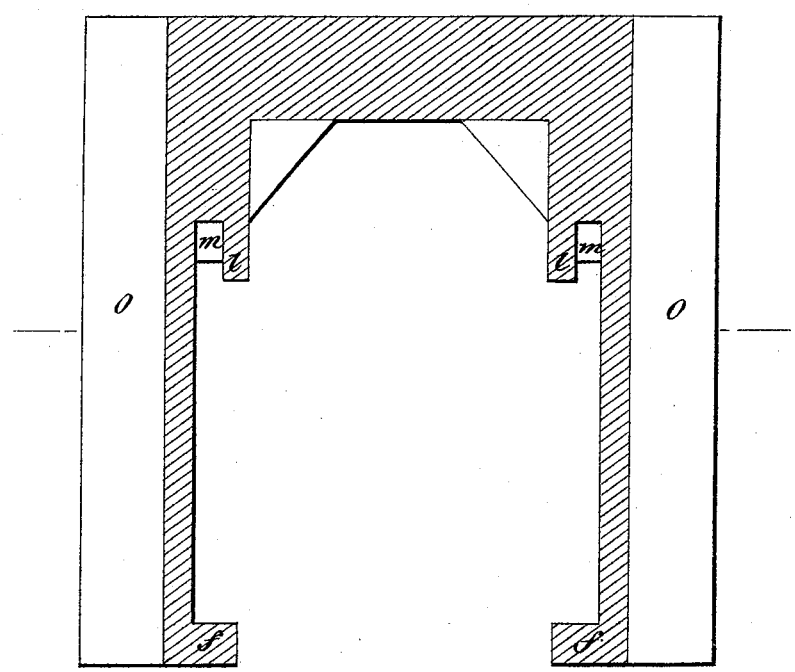
Figure 14:
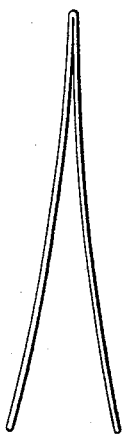
Figure 12:
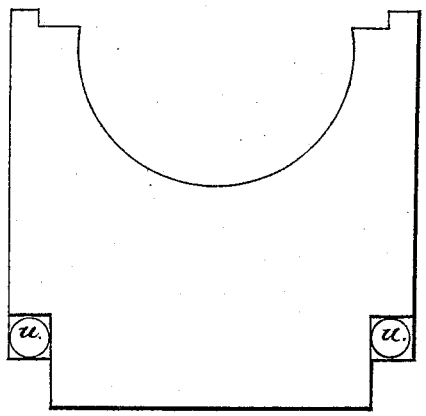
Figure 13:
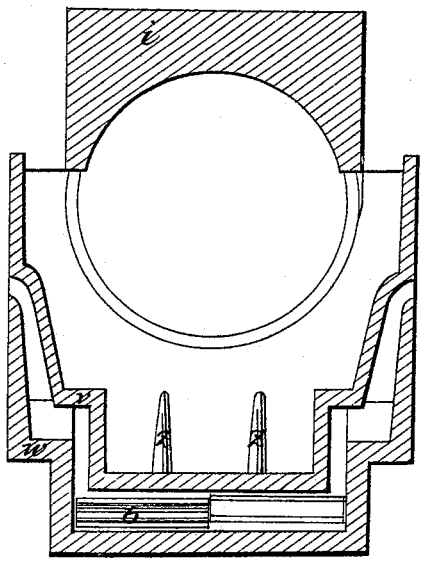
Figure 15:
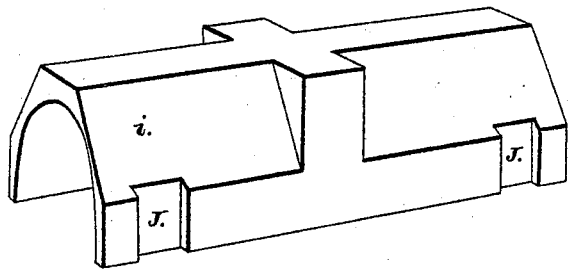
Figure 16:
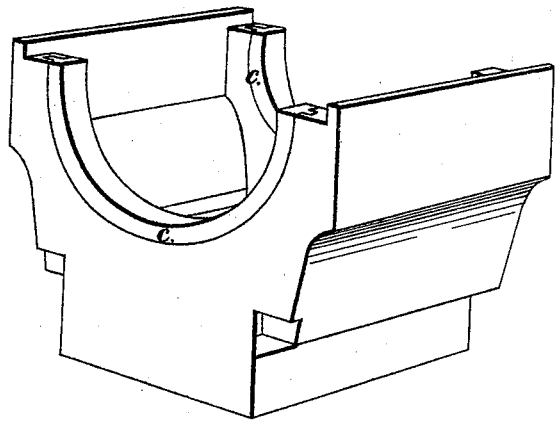

Figure 1 is a perspective view of the box; Fig. 2, a plan; Fig. 3, a longitudinal elevation; Fig. 4, a transverse elevation; Fig. 5, a view of the bottom; Fig. 6, an elevation of the side opposite to Fig. 3 or inside toward the collar; Fig. 7, a plan of the outside cell; Fig. 8, a side view of the outside cell; Fig. 9, a square bolt with an oblong head; Fig. 10, is a plan of the seat as it would appear when turned bottom up; and cut by a horizontal plane (see intersecting line Fig. 11.) Fig. 11 is a longitudinal section of the seat (see intersecting line Fig. 2.) Fig. 12 is an elevation of the end of the outside cell; Fig. 13 is a transverse section of the outside cell with the inside cell in it and the composition bearing in its position above them (see intersecting line Fig. 7); Fig. 14, edge view of a spring; Fig. 15, perspective view of the composition bearing; Fig. 16, a perspective view of the inside cell.

This box is constructed with an inside cell to be filled with waste and oil or other suitable material and placed upon springs as seen at *b* Fig. 13; these springs are for keeping the inside cell with the waste and oil snug up against the shaft and preventing the oil from running out, and also to cause this cell to move upward as the composition bearing wears away (the springs should have sufficient set to raise the cell the thickness of the brass or composition bearing as it wears away). Two of these are laid in the bottom of the outside cell in opposite ways, as wide as the cell will permit lengthwise with the cell, and the inside cell is set in upon them in the position as seen in Fig. 13. This inside cell is made of cast iron, but I contemplate having a composition of softer metal, cast into each end as seen at *c*, Fig. 16, for durability and wear against the shaft or bearing. The outside cell is to hold the springs and inside cell in their places and also to catch the escape oil if any and also to form in part the lateral bearings against the hub and coller *d* and *e*, Fig. 4. The sides of this outside cell are a little higher than the openings in the ends so that the oil that runs over will oil the lateral bearings. The square bolts, Fig. 9, are laid upon the projections *f f*, Fig. 11, with the heads to the wheel side and the cells when put together slid to their place upon them and bolted by means of the nuts *h*, Figs. 4, 5 and 6.

I, Figs. 3, 6 and 13 and 15, are different views of the brass. This brass has four recesses J, J, Fig. 15, to receive the ends of the inside cell and allow it to move upward as the brass wears away, the ends of the cell spanning the brass and sliding upward in these ways. This brass has another similar recess to continue the oil hole *k* Figs. 2 and 10.

The sides of the inside cell span the projections at *l l*, Fig. 11, and the recess *m m*, Fig. 11, are to receive the sides of the cell as it moves upward.

The notches *n, n, n, n*, Fig. 10, are for the ends of the inside cell to move in.

The flanges in the different figures marked *o* are to hold the box to the jaws of a truck and allow it to slide up and down in the truck jaw by means of the truck spring.

P P, Fig. 2, are seats for spring stirrup; *q*, Fig. 4, shaft; *r*, Fig. 8, a notch for bolt heads; *s s*, Fig. 4, set screws to fasten the collar to the shaft; this collar slides inward upon the shaft to allow the cells to be drawn out.

*t t*, Fig. 5, are bolt heads; *u u*, Fig. 12, are ends of bolts; *v*, Fig. 13, inside cell; *w*, outside cell.

These drawings are made for a box to be used inside the wheels, but I use my improvement for bearings outside the wheels and intend it for both, and for the driving axles to engines. The seat *x*, Fig. 3, and outside cell are also of cast iron and the whole may be made in any of the known modes of manufacturing of a similar nature. The springs are best made of steel and are bent similar to the springs of a steel trap, and should be of sufficient thickness to buoy up the cell.

The springs *z z*, Fig. 13, are to confine the waste to its place which should be sewed together with twine. *y y*, Fig. 6, are openings in the seat to admit a tool to lower the inside cell in order to allow the cells to be removed.

I am aware that boxes for railroad axles have been made with an outer and an inner cell below, the inner one to contain cotton waste and oil, and provided with springs to keep the waste up against the journal to lubricate it; and I am also aware that one half of the box has been made movable and self adjusting to the journal by springs, and therefore I do not claim broadly the use of an adjustable cell for containing cotton waste and oil; nor do I claim broadly the use of a self adjusting half box.

What I do claim as my invention and desire to secure by Letters Patent in a railroad box made with the cap box secured to the lower or main box or cell, which latter is formed to receive an inner box or cell to contain cotton waste and oil or other lubricator, is—

Making in this combination the inner box or cell with projecting lips, as herein described, which embrace the lower half of the journal, to fit and slide in recesses in the sides of the brass or cap box, substantially as described, so that when the journal is inserted and the inner box or cell is forced up against the journal by the springs, the whole circumference of the journal shall be embraced to prevent the entrance of dirt and waste of oil, and yet permit the inner box or cell to approach the upper box or the surfaces wear, as described, the fitting of the lips of the inner cell within the recesses of the cap box permitting the two to approach and recede from each other without a break, for the escape of oil, in the circle of the surfaces which embrace the journal—as herein described.

WM. B. GAGE.

Witnesses:
ISAAC HALL,
DARIUS MATHEWSON.